United States Patent [19]
Leitch et al.

[11] Patent Number: 6,163,698
[45] Date of Patent: Dec. 19, 2000

[54] LINK SETUP METHOD FOR A NARROWBAND CELLULAR COMMUNICATION SYSTEM

[75] Inventors: Clifford Dana Leitch, Coral Springs; Thomas V. D'Amico, Boca Raton, both of Fla.

[73] Assignee: Motorola, Schaumburg, Ill.

[21] Appl. No.: 09/072,060

[22] Filed: May 4, 1998

[51] Int. Cl.[7] .................................................. H04Q 7/20
[52] U.S. Cl. ........................ 455/450; 455/434; 455/455; 455/509; 455/513; 455/67.3; 455/63
[58] Field of Search .................................. 455/450, 423, 455/445, 452, 509, 455, 513, 515, 434, 67.1, 161.3, 63, 516, 67.3

[56] References Cited

U.S. PATENT DOCUMENTS

| | | |
|---|---|---|
| 4,144,412 | 3/1979 | Ito et al. . |
| 4,736,453 | 4/1988 | Schleomer . |
| 5,287,544 | 2/1994 | Menich et al. . |
| 5,530,918 | 6/1996 | Jasinski . |
| 5,546,411 | 8/1996 | Leitch et al. . |
| 5,604,730 | 2/1997 | Tiedmann . |
| 5,666,651 | 9/1997 | Wang . |
| 5,697,053 | 12/1997 | Hanly . |
| 5,809,059 | 9/1998 | Souissi et al. ........................ 375/133 |
| 5,862,487 | 1/1999 | Fujii et al. ............................ 455/454 |
| 5,898,928 | 4/1999 | Karlsson et al. ..................... 455/450 |
| 5,903,843 | 5/1999 | Suzuki et al. ........................ 455/452 |
| 5,930,684 | 7/1999 | Keskitalo et al. ..................... 455/69 |
| 5,940,743 | 8/1999 | Sunay et al. .......................... 455/69 |
| 5,943,610 | 8/1999 | Endo ..................................... 455/69 |
| 6,002,934 | 12/1999 | Boyer et al. ......................... 455/447 |
| 6,002,942 | 12/1999 | Park ..................................... 455/522 |
| 6,009,332 | 12/1999 | Haartsen ............................. 455/450 |

*Primary Examiner*—Dwayne D. Bost
*Assistant Examiner*—Temica M. Davis
*Attorney, Agent, or Firm*—James A. Lamb

[57] ABSTRACT

A method for setting up a link for a call in a narrowband cellular communication system (100) includes, in a selective call radio (106), determining a transmitter identity and a signal quality (310, 315) of a strongest monitoring channel of a set of N monitoring channels, each of which has propagation characteristics that closely represent propagation characteristics of one of N groups of channels, and transmitting a report (330) of the transmitter identity and a signal quality of the strongest monitoring channel; and includes, in a system controller, receiving the report (405), choosing an available outbound resource (425, 430) in a first group of the N groups of channels, wherein the first group includes the strongest monitoring channel, and establishing the call (555) using the chosen available outbound resource at a bit rate that is a highest bit rate that is compatible with the signal quality.

7 Claims, 5 Drawing Sheets

6,163,698

LINK SETUP METHOD FOR A NARROWBAND CELLULAR COMMUNICATION SYSTEM

FIELD OF THE INVENTION

This invention relates in general to radio communication systems having a cellular fixed network, and in particular to a technique for selecting link setup parameters for a call in a narrowband cellular radio communication system.

BACKGROUND OF THE INVENTION

A known method of selecting a cell and a channel during a link setup for a call in a cellular communication system involves the use of a control channel that has a common inbound and a common outbound frequency for all cells and all cellular units operating in the communication system. When a link is to be set up, a mobile or portable cellular unit transmits a signal using the inbound control channel frequency, and the signal is measured at all cell site receivers at which it is received. A channel of a cell is then assigned for the call based on the signal strengths of the signals received at the cell site receivers, with preference given to the cell at which the strongest signal is received. Such a method is described in U.S. Pat. No. 4,144,412, entitled "Method of assigning a radio channel to a calling mobile body of mobile communication system and radio channel assigning system therefor," issued on Mar. 13, 1979 to Ito et al.

While this method achieves adequate results, it is not optimum because the propagation characteristics of the inbound frequency of the control channel typically do not closely represent significant propagation characteristics of the outbound frequency of the channel selected by this method, such as interference from noise, interference from co-channel signals received by the cellular unit from other groups, and Rayleigh fading dependent signal strength, and therefore the best channel is not always chosen.

For new generation radio communication systems, achieving maximum capacity is essential to success. In such systems, a selection of one of multiple transmission modes can be used to optimize throughput between a base station and a cellular unit. A description of such a system is given in U.S. Pat. No. 5,546,411, entitled "Method and Apparatus for Adaptively Selecting a Communication Strategy in a Selective Call Radio Communication System," issued on Aug. 13, 1998 to Leitch et al. While this method achieves improvements over prior art systems, it does not provide criteria for choosing a transmission channel, and does not address methods of controlling interference.

Thus, what is needed is a method that optimizes the selection of link setup parameters for use in transmitting outbound and inbound messages on a narrowband link in a cellular radio system.

DETAILED DESCRIPTION OF THE PREFERRED EMBODIMENT

Figure 1:
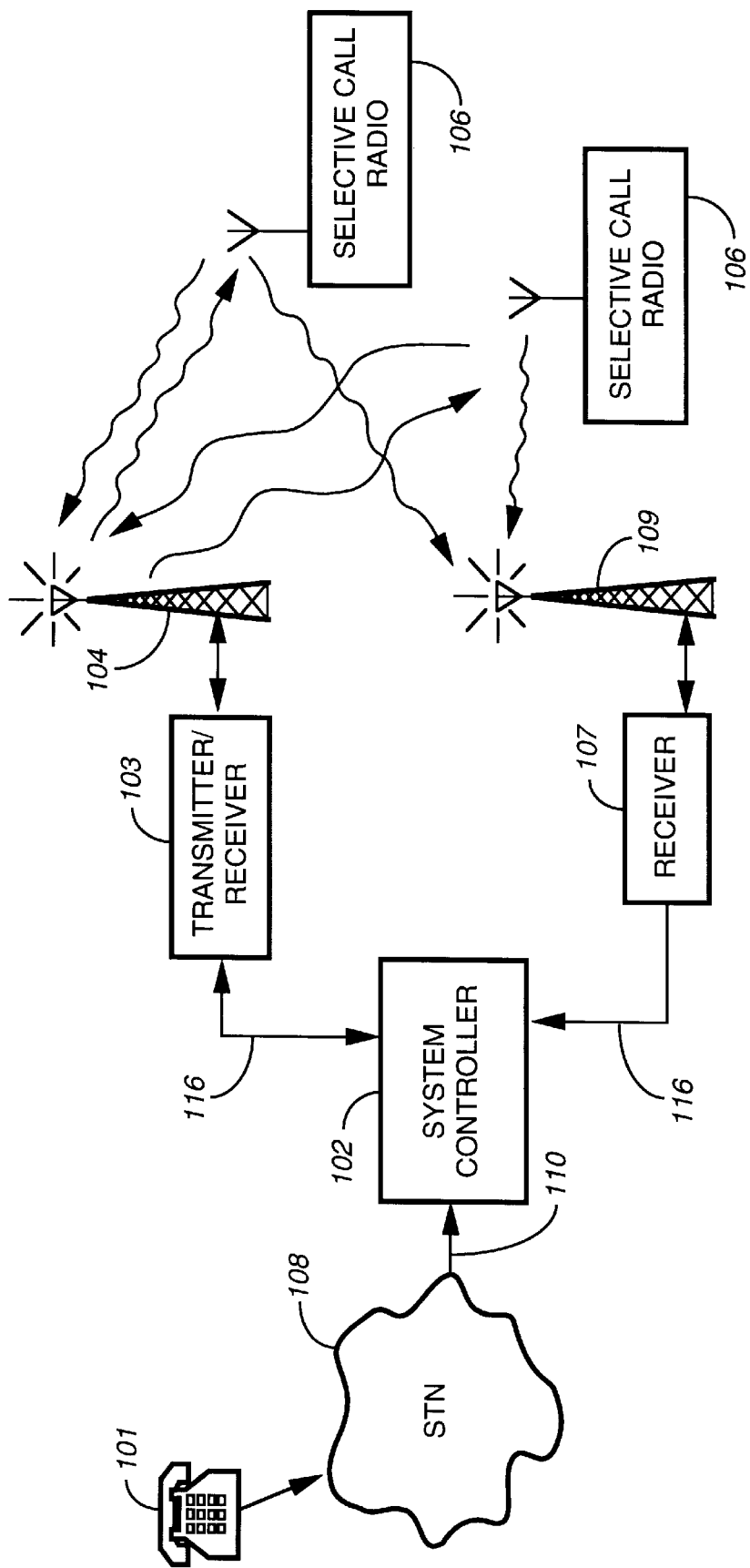
FIG. 1 is an electrical block diagram of a radio communication system, in accordance with the preferred and alternative embodiments of the present invention.

Referring to FIG. 1, an electrical block diagram of a communication system 100 is shown in accordance with the preferred and alternative embodiments of the present invention. The communication system 100 comprises a message input device, such as a conventional telephone 101, connected through a conventional switched telephone network (STN) 108 by conventional telephone links 110 to a system controller 102. The system controller 102 oversees the operation of a plurality of radio frequency (RF) transmitter/receivers 103 and RF receivers 107, through one or more communication links 116, which typically are twisted pair telephone wires, and additionally can include RF, microwave, or other high quality audio communication links. The system controller 102 functions to encode and schedule messages and telephone calls, which can include such information as two way real time telephone conversations, stored analog voice messages, digital alphanumeric messages, and response commands, for transmission by the radio frequency transmitter/receivers 103 to a plurality of selective call radios 106. The system controller 102 further functions to decode inbound messages, including inbound portions of telephone calls, unsolicited messages and scheduled response messages, received by the radio frequency transmitter/receivers 103 or receivers 107 from the plurality of selective call radios 106.

It should be noted that the system controller 102 is capable of operating in a distributed transmission control environment that allows mixing conventional cellular, simulcast, satellite, or other coverage schemes involving a plurality of radio frequency transmitter/receivers 103 and conventional antennas 104 for providing reliable radio signals within a geographic area as large as a worldwide network. Moreover, as one of ordinary skill in the art would recognize, the telephonic and selective call radio communication system functions may reside in separate system controllers 102 which operate either independently or in a networked fashion.

It will be appreciated that the selective call radio 106 is one of several types of two-way radios, including portable or mobile telephones, two way pagers, or conventional or trunked mobile radios which optionally have data terminal capability designed in. Each of the selective call radios 106 assigned for use in the radio communication system 100 has an address assigned thereto which is a unique selective call address. The address enables the transmission of a message from the system controller 102 only to the addressed selective call radio 106, and identifies messages and responses received at the system controller 102 from the selective call radio 106.

Furthermore, each of one or more of the selective call radios 106 can have a unique telephone number assigned thereto, the telephone number being unique within the STN 108. A list of the assigned selective call addresses and correlated telephone numbers for the selective call radios 106 is stored in the system controller 102 in the form of a subscriber data base.

Figure 2:
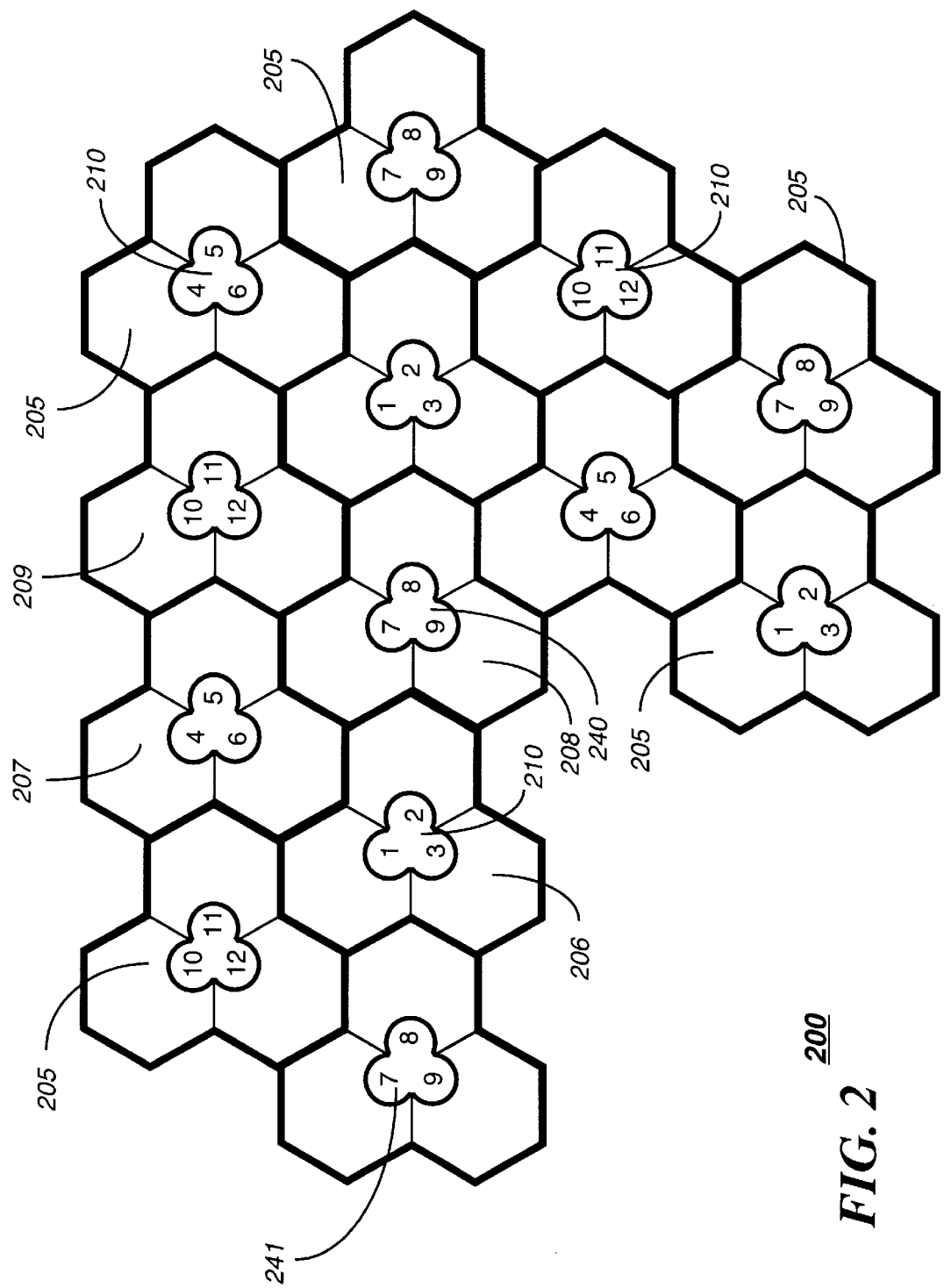
FIG. 2 is an idealized topographical diagram of a fixed cellular portion of the radio communication system, in accordance with the preferred and alternative embodiments of the present invention.

Referring to FIG. 2, an idealized topographical diagram of a fixed cellular portion 200 of the radio communication system 100 is shown, in accordance with the preferred and alternative embodiments of the present invention. The fixed cellular portion 200 comprises a plurality of cells 205, 206, 207, 208, 209, each cell being distinguished in FIG. 2 by a heavy line around three hexagonal shapes. It will be appreciated that the cells in an actual system would have varying contours as determined by the physical environment (hills, vegetation, buildings, etc.), but that the diagram suffices to describe the characteristics of significance for this description. Radio signals are transmitted from the center of each cell 210 for interception by any selective call radios operating within the cell 205, 206, 207, 208, 209. In accordance with the preferred embodiment or the present invention, the radio signals are transmitted from up to three directional antennas in each cell, each directional antenna having a beam of 120 degrees, and the cells are arranged in clusters of four cells, although it will be appreciated that the benefits of the present invention are realized with omnidirectional antennas or antennas having other beam patterns and cluster sizes. Cells 206, 207, 208, and 209 form one such cluster. Telephone calls and messages are transmitted from each antenna using one or more of a plurality of link resources that are available at each antenna.

In accordance with the preferred embodiment of the present invention, the link resources comprise a group of radio channels (hereinafter, just "channels"), each of which has a plurality of predetermined time slots available for the transmission of digitized analog signals or digital information. In the example used herein, each group of channels comprises up to 10 outbound channels and 10 inbound channels. The benefits of the present invention will be realized with fewer outbound and inbound channels in all groups, for example three or four. In order to allow for simultaneous transmission to many selective call devices, the channels (both outbound and inbound) used in one group in a cluster are different from the channels used in all other groups in the cluster. Thus, in the example used herein, in each cell 205, 206, 207, 208, 209 there are up to three groups comprising up to 30 outbound and 30 inbound channels and there are a total of 12 groups comprising up to 120 different outbound and 120 different inbound channels used in the radio communication system 100, with one or more groups of channels repeated in each cluster. More generically, it can be said that there are N groups of channels and a set of N monitoring channels. The groups are numbered 1–12 in FIG. 2. In accordance with the preferred embodiment of the present invention, the outbound channels and the inbound channels in each group each form a set of consecutive radio channels in terms of the radio frequency band each channel occupies, and one of the outbound channels is identified as a monitoring channel. Preferably, the frequency band of the monitoring channel is essentially at a center frequency of a group frequency band that encompasses all the outbound channels in the group, and as such, significant propagation characteristics of the monitoring channel closely represent the significant propagation characteristics of all the outbound channels in the group. The significant propagation characteristics include (but are not limited to) interference from noise, interference from co-channel signals transmitted from other groups, and terrain dependent average signal strength.

Figure 3:
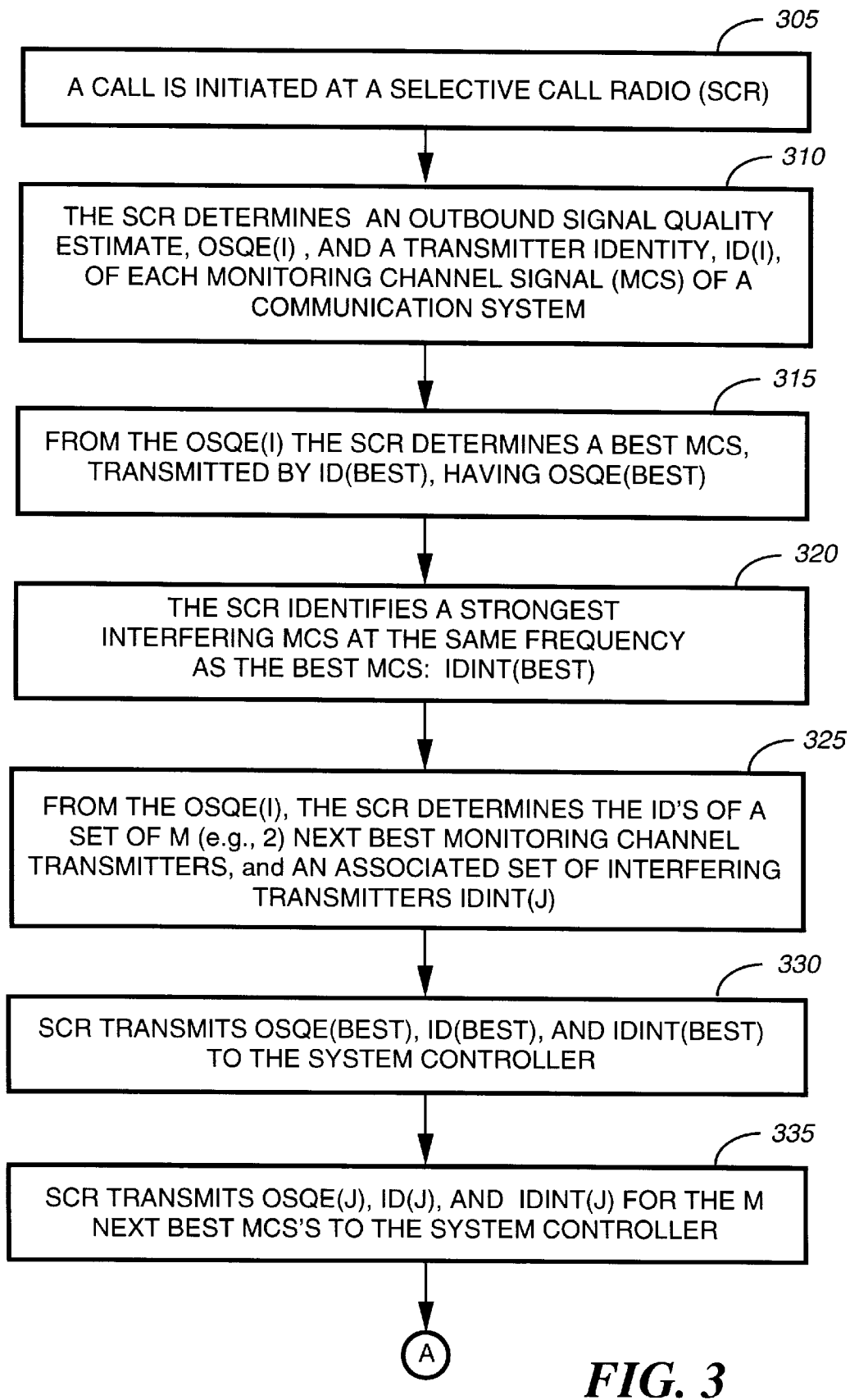
FIGS. 3–5 show a flow chart of a method of selecting link setup parameters used in a radio communication system, in accordance with the preferred and alternative embodiments of the present invention.
Figure 4:
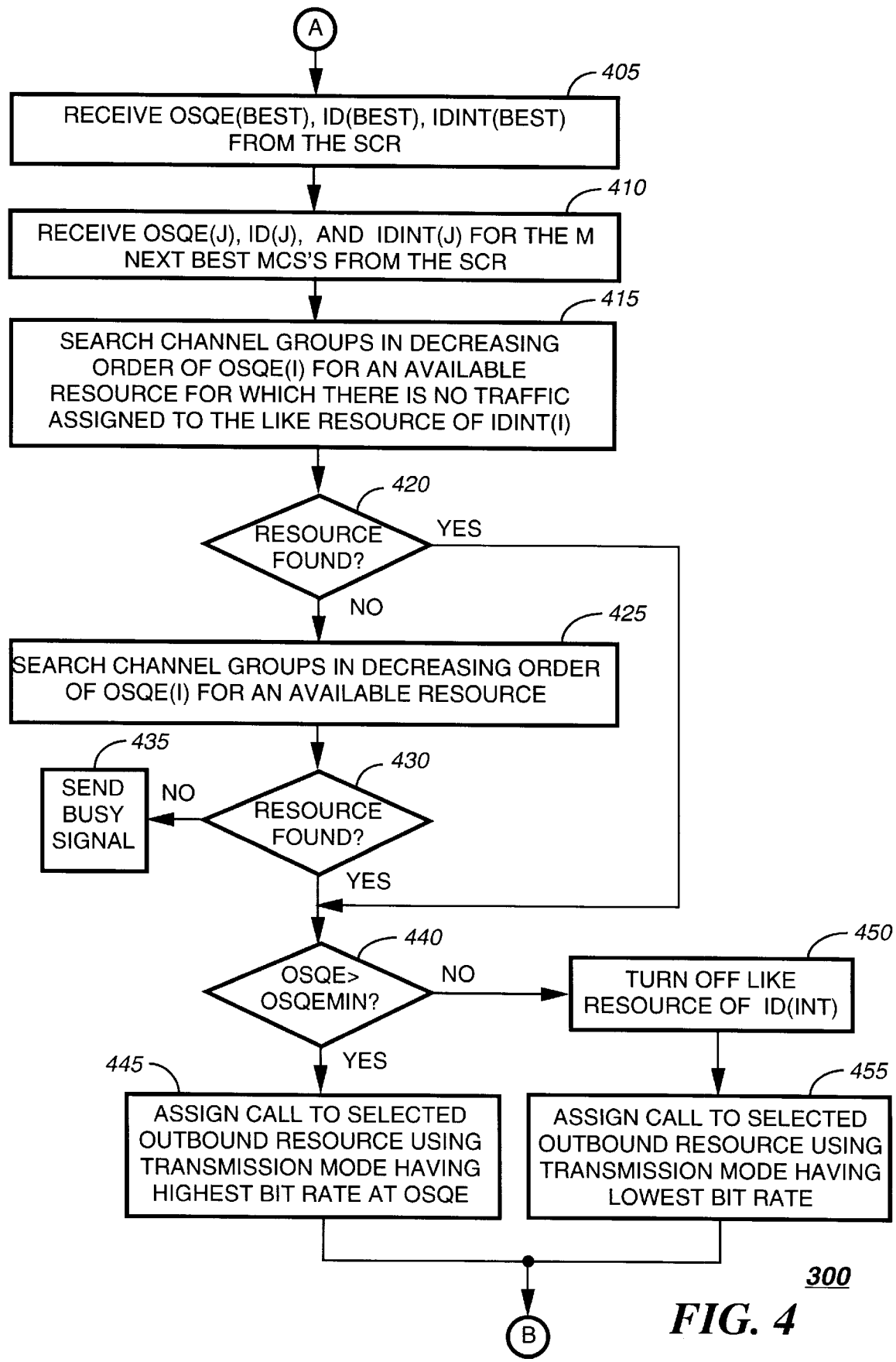
Figure 5:
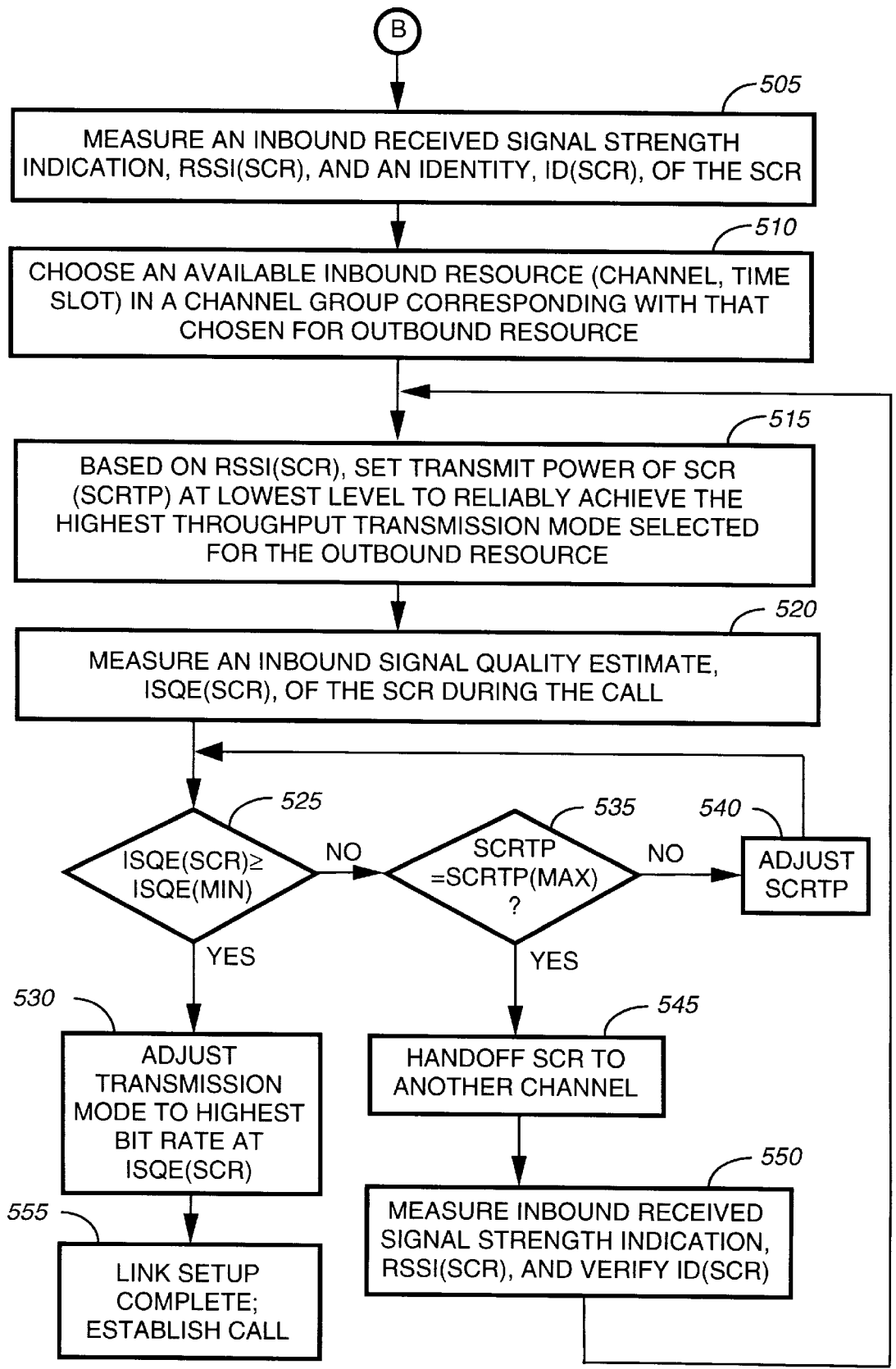

Referring to FIGS. 3–5, a flow chart 300 of a method of selecting link setup parameters used in a radio communication system 100 is shown, in accordance with the preferred and alternative embodiments of the present invention. The steps shown in FIGS. 3 and 5 are performed in a selective call radio (SCR) 106, while those shown in FIG. 4 are performed in the system controller 102. At step 305, a call is initiated at the SCR 106. This can be in response to a call placed to or from the SCR 106. The call can be a telephony call a non-real time voice call (for example, a stored voice message), or a data message, such as an alphanumeric message or a graphics message. When the call is being placed to the SCR 106, the SCR 106 is notified by use of a home, or paging channel, that a call is to be established, in a conventional manner. In response to the initiation of the call, the SCR 106 at step 310 determines an average outbound signal quality estimate, OSQE(i), and a transmitter identity, ID(i), of each of the N monitoring channels in the radio communication system 100, measuring each of the N monitoring channels so as to average out fast fading effects caused by motion of the SCR 106. The transmitter ID(i) identifies not only the cell in which the transmitter is located, but also identifies the sector of the cell transmitting the monitoring channel. The OSQE(i) for each monitoring channel is preferably representative of a signal to noise plus interference ratio of the monitoring channel, and is preferably determined in a conventional manner such as from a bit error rate of a predetermined data pattern, such as a synchronization pattern, but can alternatively be determined by a measurement of characteristics of the demodulated analog signal related to the eye pattern, such as degree of variance from the discreet set of signal amplitudes corresponding to the transmitted symbols, or degree of variance in times of zero crossings of the signal, both of which indicate corruption of the received signal by noise and/or interference. From the OSQE(i), the SCR 106 determines a best monitoring channel of the set of N monitoring channels at step 315, which is transmitted by transmitter ID(Best), and that has a signal quality estimate OSQE(Best). In accordance with the preferred embodiment of the present invention, the SCR 106 at step 320 also determines a strongest interfering monitoring channel at the same frequency as the strongest monitoring channel, having identity IDINT(Best). This is accomplished, for instance, by monitoring a "color code" simultaneously generated by each cell site transmitter 103 during a predetermined time period of a synchronous protocol, such as a synchronization time period. In this example a tone burst is used for the color code. Four transmitters 103 of each cluster of four cells described with reference to FIG. 2 each have a common color code tone burst that is one of five tones, such as 500 Hz, 800 Hz, 1100 Hz, 1400 Hz, and 1700 Hz. Five tones allow for all clusters (a maximum of four is possible) that are adjacent to any one cluster to have differing color tones. By measuring the magnitude of each of the tones during the synchronization period, the SCR can determined the received strength of the closest co-channel monitoring channel. It will be appreciated that this can be accomplished by using other predetermined signals that are generated in common by each monitoring channel in a cluster, but which are orthogonal to signals generated in other adjacent clusters. For example, the color codes could be time division multiplexed codes within the predetermined portion of a synchronize protocol, or a unique bit pattern.

In accordance with a first alternative embodiment of the present invention, having determined the strongest interfering monitoring channel (at step 320) the SCR 106 next determines the ID's of a set of M transmitters 103 of next best monitoring channels, and an associated set of interfering transmitters, which are identified with IDINT(j), at step 325. In this example, M is 2; that is, the two next best transmitters are determined and identified. At steps 330 and 335, the SCR 106, in accordance with the preferred embodiment of the present invention, transmits the OSQE(Best), ID(Best), and IDINT(Best) to the system controller 102. At step 335, in accordance with the first alternative embodiment of the present invention, the SCR 106 transmits the OSQE(j), ID(j), and IDINT(j) to the system controller 102. In accordance with a second alternative embodiment of the present invention, the SCR 106 does not measure, at steps 320, 325 nor report, at steps 330, 335, the strongest interfering signals IDINT(Best) and IDINT(i). Steps 325 and 335 are performed only in accordance with the first alternative embodiment of the present invention. The first and second alternative embodiments are not mutually exclusive.

Referring now to FIG. 4, the system controller receives OSQE(Best), ID(Best), and IDINT(Best) from the SCR 106 at step 405 in accordance with the preferred embodiment of the present invention, and, in accordance with the first alternative embodiment of the present invention, receives the OSQE(j), ID(j), and IDINT(j) at step 410. In accordance with the preferred and first alternative embodiments of the present invention, the system controller searches for an available outbound resource in the channel group associated with ID(Best) for which the like resource of the channel group associated with IDINT(Best) is not scheduled for traffic, at step 415. The available outbound resource comprises an available channel in the channel group and a time slot in a frame of the available radio. The time slot is repetitively used in consecutive periodic frames of the protocol for the call, and is considered a time division subchannel of the channel. It will be appreciated that, in some circumstances, the channel can be entirely dedicated to a call for one SCR 106. Such a circumstance can arise when a very slow bit rate modulation scheme is chosen for the call, or when a high throughput is required for a particular call.

As an example of determining whether a like resource is scheduled for traffic, when the ID(Best) identifies the monitoring channel of radio group 8 as being transmitted by a first transmitter (such as location 240 in FIG. 2) and IDINT(Best) identifies monitoring channel of channel group 8 as being transmitted by a second transmitter (such as location 241 in FIG. 2), and the system controller tests channel 83 and time slot 34 at the first transmitter as a possible outbound resource for the call at step 415, the system controller 102 then determines whether channel 83 and time slot 34 at the second transmitter are already scheduled for use in channel group 8. If they are, then the system controller seeks another available outbound resource in the channel group 8 at step 415.

When all outbound resources in the channel group associated with ID(Best) are eliminated by this test, the system controller 102, in accordance with the first alternative embodiment of the present invention, seeks, at step 415, an outbound resource in the next best channel groups, as identified by the ID(J), in order of their quality as indicated by the OSQE(j) received at step 410. In accordance with the first alternative embodiment of the present invention, the number of next best monitoring channels, M, reported is two, so, for example, if the best channel group is 8, the next best channel groups could be, for instance, j=7 and j=12. When all outbound resources in all the channel groups associated with ID(Best) and ID(j) are eliminated by this test, i.e., no outbound resources are found at step 420, then a more lenient test is performed at step 425, in which the same procedure is used as described above for step 415, except that the restriction that there be no traffic scheduled for the like outbound resource of the channel group that is associated with IDINT is not used. Thus, the system controller 102 need not test what traffic is scheduled at the IDINT(Best) or IDINT(j). When all outbound resources in all the channel groups associated with ID(Best) and ID(j) are eliminated by this test (i.e., no outbound resources are found) at step 430, then there are no available outbound resources and a busy signal is sent back to the SCR 106 at step 435.

In accordance with the second alternative embodiment of the present invention, no interfering transmitters are identified and the test at step 415 and decision at step 420 are skipped.

In accordance with the preferred and alternative embodiments of the present invention, when an available outbound resource is found at step 420 or step 430 the system controller 102 then determines whether the OSQE(i) is above a predetermined minimum value of OSQE, OSQE (min) at step 440, and when it is, the system controller 102 assigns the call at step 445 to the selected outbound resource, and further determines a transmission mode having the highest bit rate that is compatible with the OSQE(i) of the monitoring channel of the channel group from which the outbound resource has been chosen. The transmission mode having the highest bit rate that is compatible with the OSQE(i) is preferably determined from a table that generates one of a plurality of transmission modes from the OSQE(i), although alternative methods can be also used, such as a formula. For example, a protocol can have three transmission modes: binary frequency modulation (FM), 4 level FM, or 8 level FM, that correspond to three ranges of OSQE(i). When the OSQE(i) is below a predetermined OSQE(min) at step 440, then in accordance with the preferred embodiment of the present invention, the transmitter power for the selected outbound resource is shut off at the interfering transmitter IDINT(i) at step 450 during the use of the selected outbound resource for the call, and the system controller 102 assigns the call at step 455 to the selected outbound resource, and further selects a transmission mode having the lowest bit rate used by the SCR 106 and system controller 102. In an alternative approach, when OSQE(i) is below the predetermined OSQE(min) at step 440, the interfering transmitter IDINT(i) is not shut off, a busy signal is sent to the SCR 106, and the call must be reinitiated later.

Referring now to FIG. 5, when the system controller 102 receives the OSQE(i) information from the SCR 106 at steps 405 and 410 described above, the system controller 102 measures an inbound received signal strength indication (RSSI) of the signal bearing the information, and an identity of the SCR 106, ID(SCR) at step 505. It will be appreciated that, alternatively, another characteristic of the signal could be used, such as one of the signal quality values described above with reference to step 310. Then, when the outbound resource has been determined at step 445 or 455, the system controller 102 chooses an available inbound resource (inbound channel and time slot thereof) at step 510 in a channel group corresponding to the channel group that includes the outbound resource. At step 515, the system controller 102 sends a control message to the SCR 106 that sets the transmit power level of the SCR 106 (SCRTP) at a lowest level that reliably achieves a highest throughput transmission mode. The lowest level is preferably obtained from a stored table of power levels versus RSSI that provides a power level that assures the desired signaling reliability. This power level is used by the SCR 106 when the call is established.

As the call progresses, the system controller 102 measures an inbound signal quality estimate (ISQE) of the inbound signal from the SCR 106 during the call, at step 520, and compares the ISQE to a predetermined minimum value, ISQE(min), at step 525. When the ISQE is determined to be greater than or equal to ISQE(min) at step 525, the system controller 102 sends a command message to the SCR 106 to adjust the transmission mode, at step 530, to a highest level at which reliable communications are assured, as determined from a predetermined table, at which time the link setup is complete and the call is established at step 555. When, however, ISQE is less than the ISQE(min) at step 525, the system controller 102 determines at step 535 whether SCRTP is less than a maximum value, SCRTP(max), and when it is less than SCRTP(max), the system controller 102 sends a command to the SCR 106 at step 540 to increase SCRTP by a predetermined amount, after which the system PT02691U controller 102 measures a new ISQE and once again makes a determination as to whether the new ISQE is greater than the ISQE(min) at step 525. When, however, the SCRTP is determined to be set to the maximum value, SCRTP(max) at step 535, then the system controller effectuates a handoff of the call to another inbound channel group at step 545, after which the system controller 102 measures another RSSI of a signal transmitted by the SCR 106, and verifies the identity of the SCR 106, ID(SCR) at step 550. The method then continues at step 515 to attempt a link setup on the new channel. By the use of the method described above with reference to FIG. 5, an inbound channel, SCR 106 power level, and transmission mode are determined that provide a low power and high bit rate, hereby improving inbound call throughput.

It will be appreciated that by using the unique method described herein, an improved selection of an outbound channel frequency is made which relies on the similarity of the characteristics of the monitoring channels to the other channels in the channel group, thereby making an efficient selection of an outbound resource for setting up a call link at a highest practical but rate. Furthermore, the determination of a strongest interfering transmitter allows a selection of an outbound resource for the call that avoids interference, and provides a shut down of the interfering outbound resource when necessary to effectuate completion of the call. A simulation of the performance of a radio communication system operated in accordance with the preferred embodiment of the present invention as described above with reference to FIGS. 1–5, for both inbound and outbound resource selection and link setup, using a Monte Carlo simulation, shows 2.5 times throughput improvement over a radio communication system that simply operates at a uniform bit rate chosen to provide high reliability throughput.

We claim:

1. A method for setting up a link for a call in a narrowband cellular communication system, comprising the steps of:
   in a selective call radio,
      determining a transmitter identity and a signal quality of a strongest monitoring channel of a set of N monitoring channels, wherein each monitoring channel in the set of N monitoring channels is a member of one of N groups of channels and has propagation characteristics that closely represent propagation characteristics of the one of N groups of channels, and wherein each of the N groups of channels comprises a group of at least three consecutive outbound channels transmitted from one antenna that are not in any other of the N groups of channels, and
      transmitting a report of the transmitter identity and a signal quality of the strongest monitoring channel; and
   in a system controller,
      receiving the report,
      choosing an available outbound resource in a first group of the N groups of channels, wherein the first group includes the strongest monitoring channel, and establishing the call using the chosen available outbound resource at a bit rate that is a highest bit rate that is compatible with the signal quality.

2. The method according to claim 1, further comprising the steps of:
   in the selective call radio,
      determining a transmitter identity of a strongest interfering transmitter, and
      including the transmitter identity of the strongest interfering transmitter in the report, and
   in the system controller,
      turning off a co-channel outbound resource of the strongest interfering transmitter while the call is being transmitted from the chosen available outbound resource, when the signal quality is below a minimum signal quality.

3. The method according to claim 1, wherein in the step of choosing an available outbound resource, the choice of the available outbound resource is made by determining an available outbound resource for which a co-channel outbound resource of the strongest Interfering transmitter is not scheduled to be utilized while the chosen available outbound resource is used for the call.

4. The method according to claim 1, wherein the frequency band of each monitoring channel is essentially at the center of the group frequency band of the one of the N groups of channels within which the monitoring channel exists.

5. The method according to claim 1, further comprising the steps of:
   in the selective call radio,
      determining a transmitter identity and a signal quality of a next strongest monitoring channel of the set of N monitoring channels,
      including the transmitter identity and the signal quality of a next strongest monitoring channel in the report; and
   in the system controller,
      choosing an available outbound resource in a group of channels that includes the next strongest monitoring channel when no outbound resource is available in the group of channels that includes the strongest monitoring channel.

6. The method according to claim 1, wherein the steps of determining a transmitter identity and a signal quality and transmitting a report are repeated during the call, after the step of establishing the call.

7. The method according to claim 1, further comprising the steps of:
   in the system controller,
      choosing an inbound resource from the one of the N groups of channels that includes the strongest monitoring channel, and
      measuring a received signal strength indicator (RSSI) of a signal received by the system controller,
      settle a transmit power of the selective call radio to an initial level determined by the RSSI and the highest bit rate,
      determining an inbound signal quality estimate of the signal received by the selective call radio, and
      adjusting the bit rate upward to a predetermined highest bit rate for the inbound signal quality estimate.

* * * * *